United States Patent
Luo et al.

(10) Patent No.: US 10,831,298 B2
(45) Date of Patent: Nov. 10, 2020

(54) TOUCH DISPLAY MODULE, DISPLAY DEVICE AND TRANSPARENT OPTICAL ADHESIVE LAYER STRUCTURE

(71) Applicants: Chengdu BOE Optoelectronics Technology Co., Ltd., Chengdu, Sichuan Province (CN); BOE Technology Group Co., Ltd., Beijing (CN)

(72) Inventors: Hongqiang Luo, Beijing (CN); Jianjun Wu, Beijing (CN); Fuzheng Xie, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/619,973

(22) PCT Filed: Apr. 8, 2019

(86) PCT No.: PCT/CN2019/081778
§ 371 (c)(1),
(2) Date: Dec. 6, 2019

(87) PCT Pub. No.: WO2019/205923
PCT Pub. Date: Oct. 31, 2019

(65) Prior Publication Data
US 2020/0183523 A1 Jun. 11, 2020

(30) Foreign Application Priority Data
Apr. 27, 2018 (CN) .......................... 2018 1 0390660

(51) Int. Cl.
*G06F 3/041* (2006.01)

(52) U.S. Cl.
CPC .. *G06F 3/0412* (2013.01); *G06F 2203/04102* (2013.01)

(58) Field of Classification Search
CPC ......... G06F 3/0412; G06F 2203/04102; G06F 3/04164
See application file for complete search history.

(56) References Cited

U.S. PATENT DOCUMENTS

| 2007/0108032 A1* | 5/2007 | Matsumoto ........... G06F 3/0412 200/512 |
| 2009/0021679 A1 | 1/2009 | Cheng |

(Continued)

FOREIGN PATENT DOCUMENTS

| CN | 101409976 A | 4/2009 |
| CN | 101976164 A | 2/2011 |

(Continued)

OTHER PUBLICATIONS

First Chinese Office Action issued in corresponding Chinese Patent Application No. 201810390660.3 dated Oct. 24, 2019.

*Primary Examiner* — Christopher J Kohlman
(74) *Attorney, Agent, or Firm* — Arent Fox LLP; Michael Fainberg

(57) ABSTRACT

A touch display module, a display device and a transparent optical adhesive layer structure, the touch display module comprising: a substrate; a touch film, the touch film provided with an electrical connection portion; a polarizer comprising a concave edge and a first edge, wherein extension lines of the concave edge and the first edge enclose to form a slotted area, a projection of the slotted area at least partially overlapping a projection of the electrical connection portion; a flexible circuit board, a connector of the flexible circuit board overlapping at a side of the polarizer; an adhesive layer comprising a first protrusion portion beyond an edge of (Continued)

the polarizer, and the first projection portion covering at least a partial region of the connector.

12 Claims, 4 Drawing Sheets

(56) References Cited

U.S. PATENT DOCUMENTS

| | | | |
|---|---|---|---|
| 2013/0342476 A1 | 12/2013 | Lee et al. | |
| 2014/0043577 A1 | 2/2014 | Kim et al. | |
| 2018/0124934 A1* | 5/2018 | Franklin | G06F 1/1643 |
| 2018/0284513 A1* | 10/2018 | Ishizaki | G02F 1/13452 |
| 2019/0165049 A1* | 5/2019 | Kim | H01L 27/323 |
| 2019/0198801 A1* | 6/2019 | Kuon | H01L 51/0097 |

FOREIGN PATENT DOCUMENTS

| | | |
|---|---|---|
| CN | 201995199 U | 9/2011 |
| CN | 103582296 A | 2/2014 |
| CN | 104777943 A | 7/2015 |
| CN | 106547401 A | 3/2017 |
| CN | 206196127 U | 5/2017 |
| CN | 107705716 A | 2/2018 |
| CN | 108563363 A | 9/2018 |

\* cited by examiner

TOUCH DISPLAY MODULE, DISPLAY DEVICE AND TRANSPARENT OPTICAL ADHESIVE LAYER STRUCTURE

This application is a US National Stage of International Application No. PCT/CN2019/081778, filed Apr. 8, 2019, which claims priority to China Patent Application No. 201810390660.3, filed on Apr. 27, 2018 and entitled "Touch Display Module, Display Device and Transparent Optical Clear Adhesive Structure", which is hereby incorporated by reference in its entirety.

FIELD

The present disclosure relates to the technical field of displaying, and particularly to a touch display module, a display device and a transparent optical clear adhesive structure.

BACKGROUND

With the rise of the flexible Organic Light-Emitting Diode (OLED) technologies, narrow-bezel display technologies have gradually appeared as well. What the current major manufacturers need to do is how to make four narrow bezels narrower and narrower.

At present, in a narrow-bezel OLED touch display module, a touch function can be realized by electrically connecting a touch sensor with a flexible printed circuit, and a bezel area can be reduced by backwards bending the flexible printed circuit to achieve a narrow bezel. However, when the flexible printed circuit is bent, the end of the flexible printed circuit lapped to the touch sensor is easy to upwarp, and thus is easily separated from the touch sensor, which may easily lead to a decline in the yield of the narrow-bezel touch display module.

SUMMARY

An embodiment of the present disclosure provides a touch display module. The touch display module includes: a base substrate; a touch sensor on the base substrate, wherein the touch sensor is provided with an electric connection portion; a polarizer on the side of the touch sensor away from the base substrate, wherein the polarizer includes a concave edge recessed inwards, and a first edge connected with the concave edge, the concave edge and an extending line of the first edge enclose a slotted region, and a projection of the slotted region on the base substrate at least partially overlaps with a projection of the electric connection portion on the base substrate; a touch flexible printed circuit electrically connected with the touch sensor, wherein a connector of the touch flexible printed circuit is lapped to the side of the electric connection portion of the touch sensor away from the base substrate; a cover plate on the side of the polarizer away from the base substrate; an adhesion layer between the polarizer and the cover plate, wherein the adhesion layer includes a first protruding portion exceeding the edge of the polarizer, and the first protruding portion covers at least a partial region of the connector of the touch flexible printed circuit.

Optionally, in the embodiment of the present disclosure, a projection of the connector of the touch flexible printed circuit on the base substrate is within a projection of the first protruding portion of the adhesion layer on the base substrate.

Optionally, in the embodiment of the present disclosure, a projection of the adhesion layer on the base substrate is within a projection of the cover plate on the base substrate.

Optionally, in the embodiment of the present disclosure, the touch flexible printed circuit includes a bend line, and the touch flexible printed circuit bends towards the side of the electric connection portion away from the cover plate along the bend line.

The first protruding portion includes a first protruding edge of which an extending direction is the same as an extending direction of the bend line, and a projection of the first protruding edge on the base substrate is between a projection of the bend line on the base substrate and a projection of the edge of the electric connection portion on the base substrate.

Optionally, in the embodiment of the present disclosure, a distance between a projection of the first protruding edge of the first protruding portion on the base substrate and a projection of the bend line on the base substrate is 0.1 to 0.2 mm.

Optionally, in the embodiment of the present disclosure, the touch flexible printed circuit includes two long edges perpendicular to the bend line. The first protruding portion includes two first lateral edges of which an extending direction is the same as an extending direction of the long edges. Projections of the two long edges of the touch flexible printed circuit on the base substrate are between projections of the two first lateral edges of the first protruding portion on the base substrate.

Optionally, in the embodiment of the present disclosure, a distance between the projection of each lateral edge on the base substrate and the projection of the corresponding adjacent long edge on the base substrate is not less than 0.15 mm.

Optionally, in the embodiment of the present disclosure, the electric connection portion includes: a second protruding portion formed by an outward protruding edge of the touch sensor.

Optionally, in the embodiment of the present disclosure, the second protruding portion includes: a second protruding edge of which an extending direction is the same as the extending direction of the bend line, and two second lateral edges connected with the second protruding edge. The projections of the two first lateral edges of the first protruding portion on the base substrate are between projections of the two second lateral edges of the second protruding portion on the base substrate.

Optionally, in the embodiment of the present disclosure, the adhesion layer is a transparent optical clear adhesive.

Correspondingly, an embodiment of the present disclosure further provides a display device, including the above-mentioned touch display module.

Correspondingly, an embodiment of the present disclosure further provides a transparent optical clear adhesive structure, including an adhesive body for adhering a polarizer with a cover plate, wherein the polarizer is on a touch sensor, the touch sensor is provided with an electric connection portion which is lapped to a connector of a touch flexible printed circuit; the polarizer includes a concave edge recessed inwards, and a first edge connected with the concave edge, the concave edge and an extending line of the first edge enclose a slotted region. A projection of the slotted region on a plane of the touch sensor at least partially overlaps with a projection of the electric connection portion on the plane of the touch sensor. The connector of the touch flexible printed circuit is lapped to the side of the electric connection portion of the touch sensor facing the cover plate. The adhesive body includes a first protruding portion exceeding the edge of the polarizer, and the first protruding portion covers at least a partial region of the connector of the touch flexible printed circuit.

DETAILED DESCRIPTION

Figure 1:
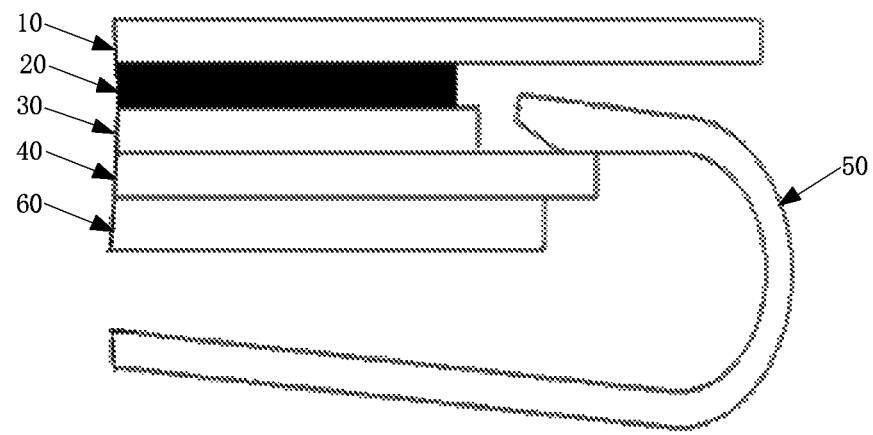
FIG. 1 is a schematic partial sectional diagram of a touch display module in the prior art.

The structural design of a narrow-bezel Organic Light-Emitting Diode (OLED) touch display module is as shown in FIG. 1. Cover glass (CG) 10, a transparent optical clear adhesive (T-OCA) 20, a polarizer (POL) 30, a touch sensor 40, a touch flexible printed circuit (TFPC) 50, a display panel 60 and the like are assembled together through different process routes. Furthermore, the display panel 60 and the touch flexible printed circuit 50 are backwards bent together (a bent portion of the display panel 60 is not clearly illustrated), so that a bezel area can be reduced to achieve a narrow bezel. However, since an electric connector of the touch flexible printed circuit 50 is bonded with the touch sensor, when the touch flexible printed circuit 50 bends, one end of the electric connector is very easy to upwarp, and thus is easily separated from the touch sensor 40, which may easily lead to a decline in the yield of the narrow-bezel touch display module.

In order to address the above-mentioned technical problems, an embodiment of the present disclosure provides a touch display module, a display device and a transparent optical clear adhesive (T-OCA) structure. Technical solutions in embodiments of the present disclosure will be described clearly and completely below in conjunction with the drawings in the embodiments of the present disclosure. Obviously, the embodiments described herein are only part of the embodiments of the present disclosure, not all the embodiments. Based on the embodiments in the present disclosure, all other embodiments obtained by those of ordinary skill in the art without creative work shall fall within the protection scope of the present disclosure.

Refer to FIGS. 2 to 7.

As shown in FIGS. 2 to 6, an embodiment of the present disclosure provides a touch display module, which includes: a base substrate (located in a display panel 6); a touch sensor 4, located on the base substrate, wherein the touch sensor 4 is provided with an electric connection portion 41; a polarizer (POL) 3, located on the side of the touch sensor 4 away from the base substrate, wherein the polarizer 3 includes a concave edge L1 recessed inwards, and a first edge L2 connected with the concave edge L1, the concave edge L1 and an extending line of the first edge L2 enclose a slotted region 31; a projection of the slotted region 31 on the base substrate at least partially overlaps with a projection of the electric connection portion 41 on the base substrate; a touch flexible printed circuit (TFPC) 5 electrically connected with the touch sensor 4, wherein a connector 51 of the touch flexible printed circuit 5 is lapped to the side of the electric connection portion 41 of the touch sensor 4 away from the base substrate; a cover plate 1, located on the side of the polarizer 3 away from the base substrate; and an adhesion layer 2, located between the polarizer 3 and the cover plate 1, wherein the adhesion layer 2 includes a first protruding portion 21 exceeding the edge of the polarizer 3, and the first protruding portion 21 covers at least partial region of the connector 51 of the touch flexible printed circuit 5.

In the above touch display module, the edge of the polarizer 3 is recessed inwards to form the slotted region 31. The slotted region 31 is surrounded by the concave edge L1 and the extending line of the first edge L2 of the polarizer 3. The touch sensor 4 is provided with the electric connection portion 41. The slotted region 31 corresponds to the electric connection portion 41 of the touch sensor 4 in the stacked direction. The projection of the slotted region 31 on the base substrate at least partially overlaps with the projection of the electric connection portion 41 on the base substrate to expose at least part of the electric connection portion, so that the connector 51 of the touch flexible printed circuit 5 has an enough space for the connection with the electric connection portion 41.

Specifically, the connector 51 of the touch flexible printed circuit 5 is lapped to the side of the electric connection portion 41 of the touch sensor 4 away from the base substrate, i.e., the side of the electric connection portion 41 of the touch sensor 4 facing the slotted region 31 of the polarizer 3. The adhesion layer 2 is located between the polarizer 3 and the cover plate 1, and is provided with the first protruding portion 21 exceeding the edge of the polarizer 3, and the first protruding portion 21 covers the connector 51 of the touch flexible printed circuit 5, which can prevent one end of the connector 51 from upwarp during bending of the touch flexible printed circuit 5, thereby avoiding breakage of electric connection between the touch flexible printed circuit 5 and the touch sensor 4. Furthermore, the first protruding portion 21 may also adhere the touch flexible printed circuit 5 with the polarizer 3 and the cover plate 1 to improve the stability of electric connection between the touch flexible printed circuit 5 and the touch sensor 4. Therefore, the touch display module is relatively high in yield.

Specifically, the electric connection portion 41 of the touch sensor 4 may include a plurality of contact terminals. The connector 51 of the touch flexible printed circuit 5 may include a plurality of connection terminals. Each connection terminal may be electrically connected with each corresponding contact terminal by bonding.

Figure 3:
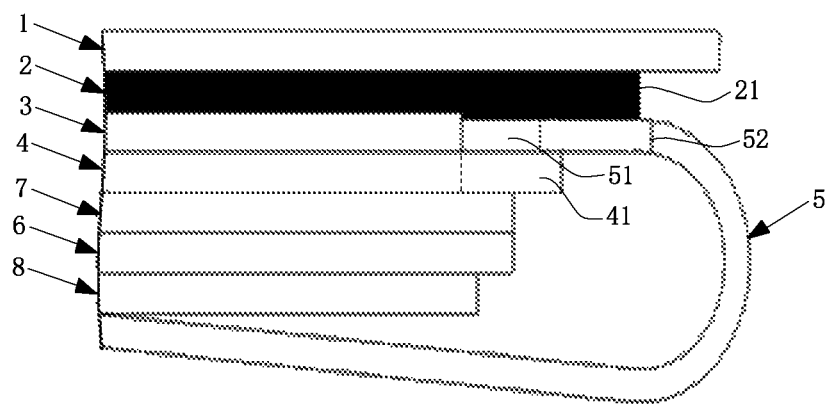
FIG. 3 is a schematic partial sectional diagram of a touch display module in accordance with an embodiment of the present disclosure.
Figure 4:
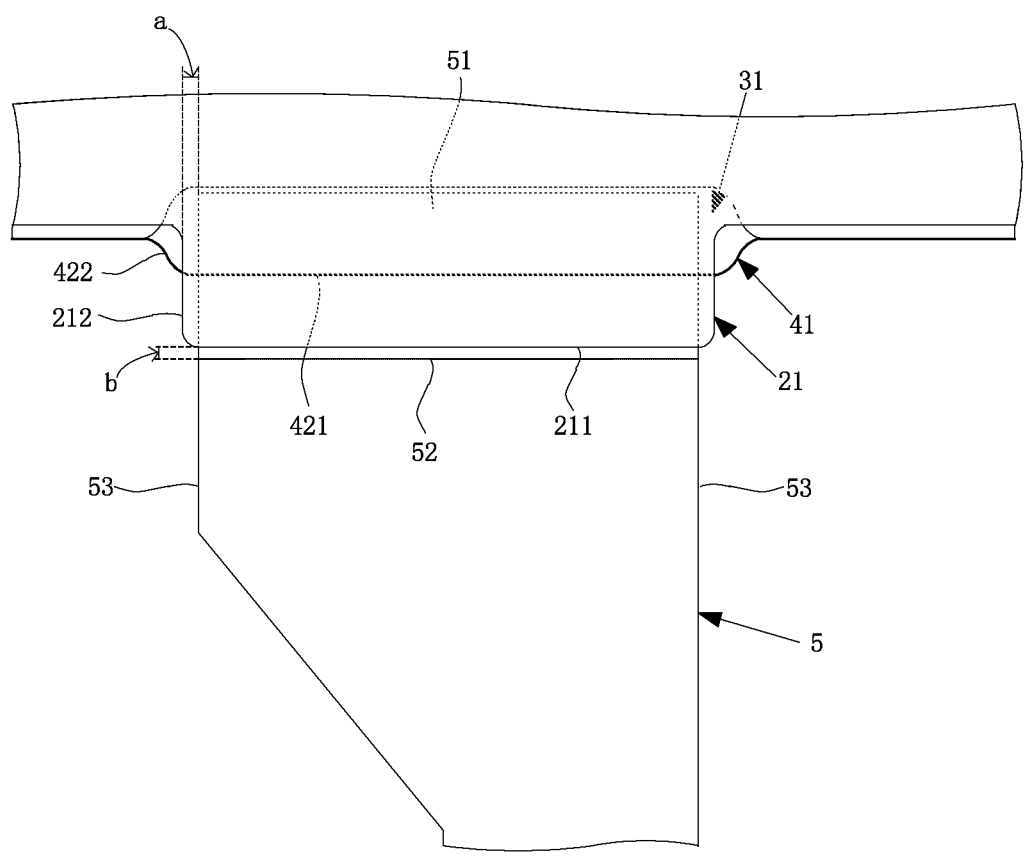
FIG. 4 is a partial top view of a touch display module in accordance with an embodiment of the present disclosure.
Figure 5:
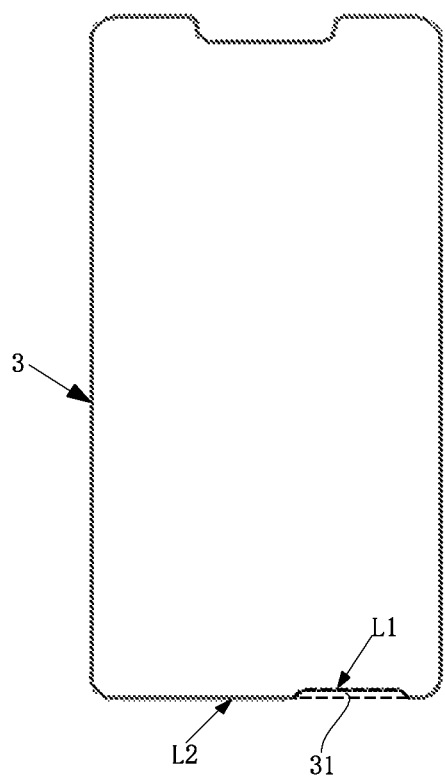
FIG. 5 is a schematic structural diagram of a polarizer in a touch display module in accordance with an embodiment of the present disclosure.

As shown in FIGS. 3 and 4, in one specific embodiment, the projection of the connector 51 of the touch flexible printed circuit 5 on the base substrate is located in the projection of the first protruding portion 21 of the adhesion layer 2 on the base substrate. That is, the first protruding portion 21 of the adhesion layer 2 completely covers the connector 51 of the touch flexible printed circuit 5, which can enhance a fixing effect on the connector 51.

As shown in FIGS. 3 and 4, in one specific embodiment, the projection of the adhesion layer 2 on the base substrate is located in the projection of the cover plate 1 on the base substrate. That is, the cover plate 1 completely covers the adhesion layer 2, so as to avoid the adhesion layer 2 from exposing towards one side of the cover plate 1 and adhering foreign matters. Furthermore, since the cover plate 1 completely covers the first protruding portion 21 of the adhesion layer 2, the touch flexible printed circuit 5 and the cover plate 1 may be adhered through the first protruding portion 21, and then the stability of connection between the touch flexible printed circuit 5 and the touch sensor 4 is improved.

As shown in FIGS. 3 and 4, in one specific embodiment, the touch flexible printed circuit 5 includes a bend line 52, and the touch flexible printed circuit 5 bends towards the side of the electric connection portion 41 away from the polarizer 3 along the bend line 52.

The first protruding portion 21 includes a first protruding edge 211 of which the extending direction is the same as an extending direction of the bend line 52, and a projection of the first protruding edge 211 on the base substrate is located between a projection of the bend line 52 of the touch flexible printed circuit 5 on the base substrate and a projection of the edge of the electric connection portion 41 on the base substrate.

In this way, after the touch flexible printed circuit 5 bends, the first protruding portion 21 may not protrude from the touch flexible printed circuit 5 to ensure a narrow bezel of the display module.

Specifically, the first protruding edge 211 may be close to the bend line 52 as much as possible, that is, the first protruding edge 211 extends close to the bend line 52 as much as possible, to enlarge an attachment area to the touch flexible printed circuit 5 and then enhance the stability of connection between the touch flexible printed circuit 5 and the touch sensor 4.

Specifically, a distance b between the projection of the first protruding edge 211 on the base substrate and the projection of the bend line 52 of the touch flexible printed circuit 5 on the base substrate may be 0.1 to 0.2 mm. In this way, the first protruding edge 211 may be close to the bend line 52 as much as possible, and a certain distance is kept between the first protruding edge 211 and the bend line 52, so as to ensure that the touch flexible printed circuit 5 can bend along the bend line 52.

Further, in the embodiment of the present disclosure, the touch flexible printed circuit 5 includes two long edges 53 perpendicular to the bend line.

The first protruding portion 21 includes two first lateral edges 212 of which the extending direction is the same as the extending direction of the long edges 53.

Projections of the two long edges 53 of the touch flexible printed circuit 5 on the base substrate are located between projections of the two first lateral edges 212 of the first protruding portion 21 on the base substrate.

That is, the two lateral edges of the first protruding portion 21 exceed the two long edges 53 of the touch flexible printed circuit 5, so that an adhesion area of the first protruding portion 21 and the touch flexible printed circuit 5 may be enlarged, and then the fixing effect on the touch flexible printed circuit 5 is enhanced.

Specifically, a distance a between the projection of each first lateral edge 212 on the base substrate and the projection of the corresponding adjacent long edge 53 on the base substrate is not less than 0.15 mm. That is, the lateral edges of the first protruding portion 21 exceed the long edges 53 of the touch flexible printed circuit 5 by not less than 0.15 mm.

Figure 6:
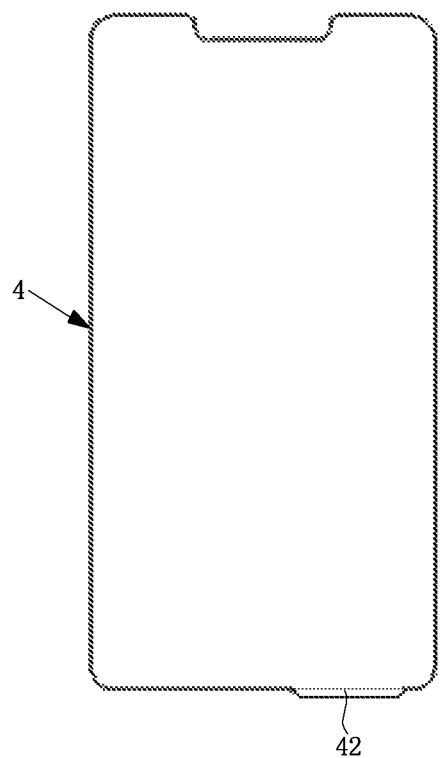
FIG. 6 is a schematic structural diagram of a touch sensor in a touch display module in accordance with an embodiment of the present disclosure.

As shown in FIGS. 4 and 6, in one optional embodiment, the electric connection portion 41 includes: a second protruding portion 42 formed by an outward protruding edge of the touch sensor 4.

Specifically, the electric connection portion 41 of the touch sensor 4 includes the second protruding portion 42. The arrangement of the second protruding portion 42 may enlarge the lapping area of the electric connection portion 41 and the touch flexible printed circuit 5 to guarantee the stability and reliability of electric connection.

Specifically, the second protruding portion 42 includes: a second protruding edge 421 of which the extending direction is the same as the extending direction of the bend line 52, and two second lateral edges 422 connected with the second protruding edge 421.

The projections of the two first lateral edges 212 of the first protruding portion 21 on the base substrate are located between projections of the two second lateral edges 422 of the second protruding portion 42 on the base substrate.

That is, the two lateral edges of the second protruding portion 42 exceed the two lateral edges of the first protruding portion 21, so that an exposing area of the first protruding portion 21 of the adhesion layer 2 can be reduced to prevent the first protruding portion 21 from adhering foreign matters.

Figure 2:
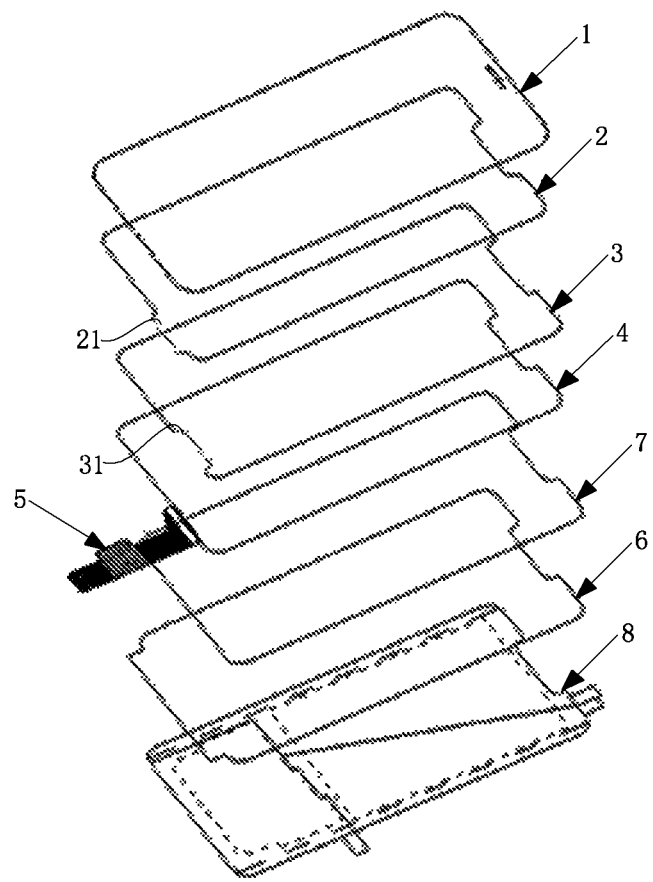
FIG. 2 is a schematic exploded structural diagram of a touch display module in accordance with an embodiment of the present disclosure.

As shown in FIGS. 2 to 4, in one specific embodiment, the adhesion layer 2 may be a transparent optical clear adhesive (T-OCA).

Further, the cover plate 1 may be cover glass (CG).

As shown in FIGS. 2 and 3, in one specific embodiment, the touch display module according to the embodiment of the present disclosure may further include a display panel 6 located on the side of the touch sensor 4 away from the polarizer 3, and a bottom adhesion layer 7 located between the touch sensor 4 and the display panel 6 and used to adhere the touch sensor 4 with the display panel 6. In addition, the touch sensor 4 may also be directly formed on the surface of the display panel 6 and then patterned to obtain its pattern. The manufacturing scheme of the touch sensor 4 is not limited herein.

Optionally, the display panel 6 may be a flexible display panel. The flexible display panel may bend to the back side together with the touch flexible printed circuit 5 to achieve a narrow-bezel design of the touch display module.

Further optionally, the display panel 6 may be an organic light-emitting diode (OLED) flexible display panel.

As shown in FIGS. 2 and 3, in one optional embodiment, the touch display module according to the embodiment of the present disclosure may further include a heat dissipation film 8 located on the side of the display panel 6 away from the touch sensor 4. The heat dissipation film 8 may dissipate heat for a back circuit board of the whole touch display module.

Specifically, the touch display module according to the embodiment of the present disclosure may be applied to display equipment such as a mobile phone, a flat computer and an e-book, and can achieve narrow-bezel displaying and increase the equipment yield.

Moreover, an embodiment of the present disclosure further provides a display device which includes the touch display module in any one of the foregoing embodiments. Optionally, the display device may be a mobile phone, a tablet and an e-book. Specifically, the display device according to the embodiment of the present disclosure can achieve a narrow-bezel design and is relatively high in yield.

Figure 7:
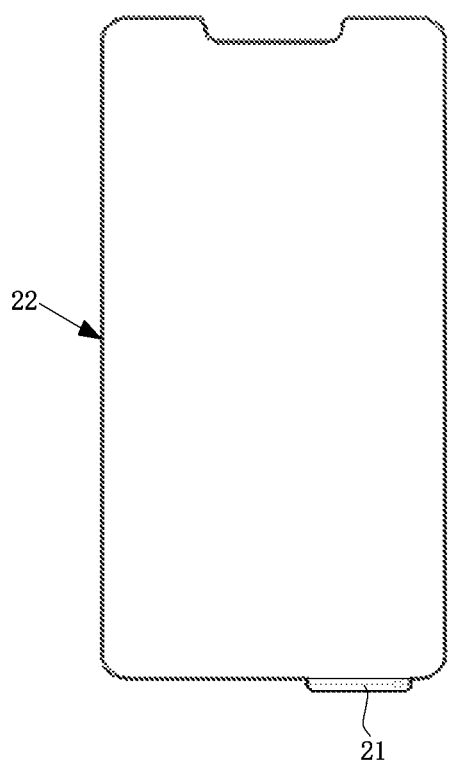
FIG. 7 is a schematic structural diagram of a transparent optical clear adhesive structure in accordance with an embodiment of the present disclosure.

Further, as shown in FIG. 7, an embodiment of the present disclosure further provides a transparent optical clear adhesive (T-OCA) structure. The T-OCA structure may include an adhesive body 22. As shown in FIGS. 2 to 4 and 7, the adhesive body 22 is used for adhering a polarizer (POL) 3 with a cover plate 1.

The polarizer 3 is located on a touch sensor 4. The touch sensor 4 is provided with an electric connection portion 41 which is lapped to a connector 51 of a touch flexible printed circuit (TFPC) 5.

The polarizer 3 includes a concave edge L1 recessed inwards, and a first edge L2 connected with the concave edge L1. A slotted region 31 is surrounded by the concave edge L1 and an extending line of the first edge L2.

The projection of the slotted region 31 on the base substrate at least partially overlaps with the projection of the electric connection portion 41 on a plane of the touch sensor 4. The connector 51 of the touch flexible printed circuit 5 is lapped to the side of the electric connection portion 41 of the touch sensor 4 facing the cover plate 1.

The adhesive body 22 includes a first protruding portion 21 exceeding the edge of the polarizer 3, and the first protruding portion 21 covers at least a partial region of the connector 51 of the touch flexible printed circuit 5.

When the T-OCA structure according to the embodiment of the present disclosure is applied to the touch display module, the adhesive body 22 is located between the polarizer 3 and the cover plate 1, and the first protruding portion 21 exceeds the edge of the polarizer 3 and covers the connector 51 of the touch flexible printed circuit 5, which can prevent one end of the connector 51 from upwarp during bending of the touch flexible printed circuit 5, thereby avoiding breakage of electric connection between the touch flexible printed circuit 5 and the touch sensor 4. Furthermore, the first protruding portion 21 may also adhere the touch flexible printed circuit 5 with the polarizer 3 and the cover plate 1 to improve the stability of electric connection between the touch flexible printed circuit 5 and the touch sensor 4. Therefore, the T-OCA structure according to the embodiment of the present disclosure can increase the yield of the touch display module.

Specifically, the specific embodiment of the T-OCA structure according to the embodiment of the present disclosure may be the same as the specific embodiment of the adhesion layer in the touch display module according to the embodiment of the present disclosure, and descriptions thereof are omitted herein.

Obviously, those skilled in the art can make various modifications and variations to the embodiments of the present disclosure without departing from the spirit and scope of the present disclosure. Thus the disclosure is also intended to encompass these modifications and variations thereto so long as the modifications and variations fall into the scope of the claims appended to the disclosure and their equivalents.

The invention claimed is:

1. A touch display module, comprising:
a base substrate;
a touch sensor on the base substrate, wherein the touch sensor is provided with an electric connection portion;
a polarizer on a side of the touch sensor away from the base substrate, wherein the polarizer comprises a concave edge recessed inwards, and a first edge connected with the concave edge, the concave edge and an extending line of the first edge enclose a slotted region, and a projection of the slotted region on the base substrate at least partially overlaps with a projection of the electric connection portion on the base substrate;
a touch flexible printed circuit electrically connected with the touch sensor, wherein a connector of the touch flexible printed circuit is lapped to a side of the electric connection portion of the touch sensor away from the base substrate;
a cover plate on a side of the polarizer away from the base substrate;
an adhesion layer between the polarizer and the cover plate, wherein the adhesion layer comprises a first protruding portion exceeding an edge of the polarizer, and the first protruding portion covers at least a partial region of the connector of the touch flexible printed circuit.

2. The touch display module according to claim 1, wherein a projection of the connector of the touch flexible printed circuit on the base substrate is within a projection of the first protruding portion of the adhesion layer on the base substrate.

3. The touch display module according to claim 1, wherein a projection of the adhesion layer on the base substrate is within a projection of the cover plate on the base substrate.

4. The touch display module according to claim 1, wherein the touch flexible printed circuit comprises a bend line, and the touch flexible printed circuit bends towards a side of the electric connection portion away from the cover plate along the bend line; and
the first protruding portion comprises a first protruding edge of which an extending direction is the same as an extending direction of the bend line, and a projection of the first protruding edge on the base substrate is between a projection of the bend line on the base substrate and a projection of an edge of the electric connection portion on the base substrate.

5. The touch display module according to claim 4, wherein a distance between the projection of the first protruding edge of the first protruding portion on the base substrate and the projection of the bend line on the base substrate is 0.1 to 0.2 mm.

6. The touch display module according to claim 4, wherein the touch flexible printed circuit comprises two long edges perpendicular to the bend line;
the first protruding portion comprises two first lateral edges of which an extending direction is the same as an extending direction of the long edges; and
projections of the two long edges of the touch flexible printed circuit on the base substrate are between projections of the two first lateral edges of the first protruding portion on the base substrate.

7. The touch display module according to claim 6, wherein a distance between the projection of each of the lateral edges on the base substrate and the projection of the corresponding adjacent long edge on the base substrate is not less than 0.15 mm.

8. The touch display module according to claim 6, wherein the electric connection portion comprises a second protruding portion formed by an outward protruding edge of the touch sensor.

9. The touch display module according to claim 8, wherein the second protruding portion comprises: a second protruding edge of which an extending direction is the same as an extending direction of the bend line, and two second lateral edges connected with the second protruding edge; and
the projections of the two first lateral edges of the first protruding portion on the base substrate are between projections of the two second lateral edges of the second protruding portion on the base substrate.

10. The touch display module according to claim 1, wherein the adhesion layer is a transparent optical clear adhesive.

11. A display device, comprising the touch display module according to claim 1.

12. A transparent optical clear adhesive structure, comprising an adhesive body for adhering a polarizer with a cover plate, wherein:

the polarizer is on a touch sensor; the touch sensor is provided with an electric connection portion which is lapped with a connector of a touch flexible printed circuit;

the polarizer comprises a concave edge recessed inwards, and a first edge connected with the concave edge, the concave edge and an extending line of the first edge enclose a slotted region;

a projection of the slotted region on a plane of the touch sensor at least partially overlaps with a projection of the electric connection portion on the plane of the touch sensor; the connector of the touch flexible printed circuit is lapped to a side of the electric connection portion of the touch sensor facing the cover plate; and the adhesive body comprises a first protruding portion exceeding an edge of the polarizer, and the first protruding portion covers at least a partial region of the connector of the touch flexible printed circuit.

\* \* \* \* \*